United States Patent
Lee et al.

(10) Patent No.: US 8,403,797 B2
(45) Date of Patent: Mar. 26, 2013

(54) GEAR TRAIN IN MULTISTAGE TRANSMISSION FOR VEHICLES

(75) Inventors: Hyuk Jun Lee, Yongin-si (KR); Jong Sool Park, Hwaseong-si (KR); Tae Seok Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/292,824

(22) Filed: Nov. 9, 2011

(65) Prior Publication Data

US 2013/0053206 A1 Feb. 28, 2013

(51) Int. Cl.
*F16H 37/02* (2006.01)

(52) U.S. Cl. ........ 475/218; 475/271; 475/280; 475/302; 475/343

(58) Field of Classification Search .......... 475/207, 475/218, 219, 269, 271, 280, 296, 302, 329, 475/330, 343
See application file for complete search history.

(56) References Cited

U.S. PATENT DOCUMENTS

| | | | | |
|---|---|---|---|---|
| 5,013,289 | A | * | 5/1991 | Van Maanen ................. 475/286 |
| 5,106,352 | A | * | 4/1992 | Lepelletier .................... 475/280 |
| 5,520,587 | A | * | 5/1996 | Hall, III ........................ 475/218 |
| 5,690,578 | A | * | 11/1997 | Hall, III ........................ 475/269 |
| 2003/0104896 | A1 | * | 6/2003 | Ohkubo ........................ 475/271 |

* cited by examiner

*Primary Examiner* — Justin Holmes
(74) *Attorney, Agent, or Firm* — Morgan, Lewis & Bockius LLP

(57) ABSTRACT

A gear train apparatus in a multistage transmission may include input and output shafts, a complex planetary gear device concentrically mounted with regard to the output shaft and having four rotary components including one rotary component coupled to the output shaft, first to third pairs of external gears, first to third clutches, a train of external gears, a fourth clutch and first and second brakes.

14 Claims, 3 Drawing Sheets

FIG. 2

| transmission stage | transmission ratio | inter-stage ratio |
|---|---|---|
| 1st | 4.60 | D1/D9 = 7.68 |
| 2nd | 2.99 | D1/D2 = 1.54 |
| 3rd | 2.31 | D2/D3 = 1.30 |
| 4th | 1.62 | D3/D4 = 1.42 |
| 5th | 1.20 | D4/D5 = 1.35 |
| 6th | 1.00 | D5/D6 = 1.20 |
| 7th | 0.84 | D6/D7 = 1.20 |
| 8th | 0.69 | D7/D8 = 1.22 |
| 9th | 0.60 | D8/D9 = 1.15 |
| Rev | −3.89 | Rev/D1 = 0.85 |

*FIG. 3*

| transmission stage | frictional element | | | | | |
|---|---|---|---|---|---|---|
| | first clutch | second clutch | third clutch | fourth clutch | first brake | second brake |
| 1st | | ● | | | ● | |
| 2nd | ● | | | | ● | |
| 3rd | ● | ● | | | | |
| 4th | ● | | | | | ● |
| 5th | ● | | ● | | | |
| 6th | ● | | | ● | | |
| 7th | | | ● | ● | | |
| 8th | | | | ● | | ● |
| 9th | | ● | | ● | | |
| Rev | | | ● | | ● | |

GEAR TRAIN IN MULTISTAGE TRANSMISSION FOR VEHICLES

CROSS-REFERENCE TO RELATED APPLICATION

The present application claims priority to Korean Patent Application No. 10-2011-0085100, filed on Aug. 25, 2011, the entire contents of which is incorporated herein for all purposes by this reference.

BACKGROUND OF THE INVENTION

1. Field of the Invention

The present invention relates, in general, to a gear train in a multistage transmission mounted in vehicles, and more particularly, to a structure of a gear train in a transmission for vehicles that is capable of having nine forward speeds and one reverse speed.

2. Description of Related Art

Conventionally, a transmission with nine speeds or more that is developed for mounting in vehicles generally has four or more sets of planetary gears, as disclosed in US2009-0197733A and JP2006-349153A, in order to implement a multistage transmission.

However, if using multiple sets of planetary gears as such, the volume or entire length of the transmission tends to be increased so that adaptability to different vehicles is reduced. In addition, since the set of planetary gears naturally has lesser power transmission efficiency than that of gear trains in which gears are simply circumscribed or inscribed, it is disadvantageous in the context of power transmission efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a gear train in a multistage transmission for vehicles in which relatively fewer sets of planetary gears are used for implementing multistage transmission as desired so that the volume or entire length of the transmission is decreased thereby becoming compact and thus considerably improving the adaptability to different vehicles, and improving power transmission efficiency.

In an aspect of the present invention, a gear train apparatus in a multistage transmission for vehicles may include input and output shafts disposed parallel with each other, a complex planetary gear device concentrically mounted with regard to the output shaft and having four rotary components including one rotary component coupled to the output shaft, first to third pairs of external gears designed to allow the input shaft to mesh with respective three rotary components of the complex planetary gear device, first to third clutches designed to selectively interrupt the coupling of the three rotary components of the complex planetary gear device to the input shaft via the first to third pairs of external gears respectively, a train of external gears designed to allow either of the rotary components of the complex planetary gear device, other than the rotary component coupled to the output shaft, and the input shaft to engage in a series of two external meshes, a fourth clutch designed to selectively interrupt a power transmission path of the train of external gears, and first and second brakes designed to respectively selectively interrupt the rotation of the second and third pairs of external gears.

Accordingly, in the gear train in a multistage transmission for vehicles, relatively fewer sets of planetary gears are used for implementing multistage transmission as desired so that the volume or entire length of the transmission is decreased, thereby becoming compact and thus considerably improving adaptability to vehicles, and improving power transmission efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a diagram in the form of a table, which shows gear ratios and inter-gear ratios for the respective transmission stages which are implemented by the gear train in the multistage transmission for vehicles.

FIG. 3 is a diagram in the form of a table, which shows frictional elements for the respective transmission stages of the gear train in the multistage transmission for vehicles.

Figure 1:
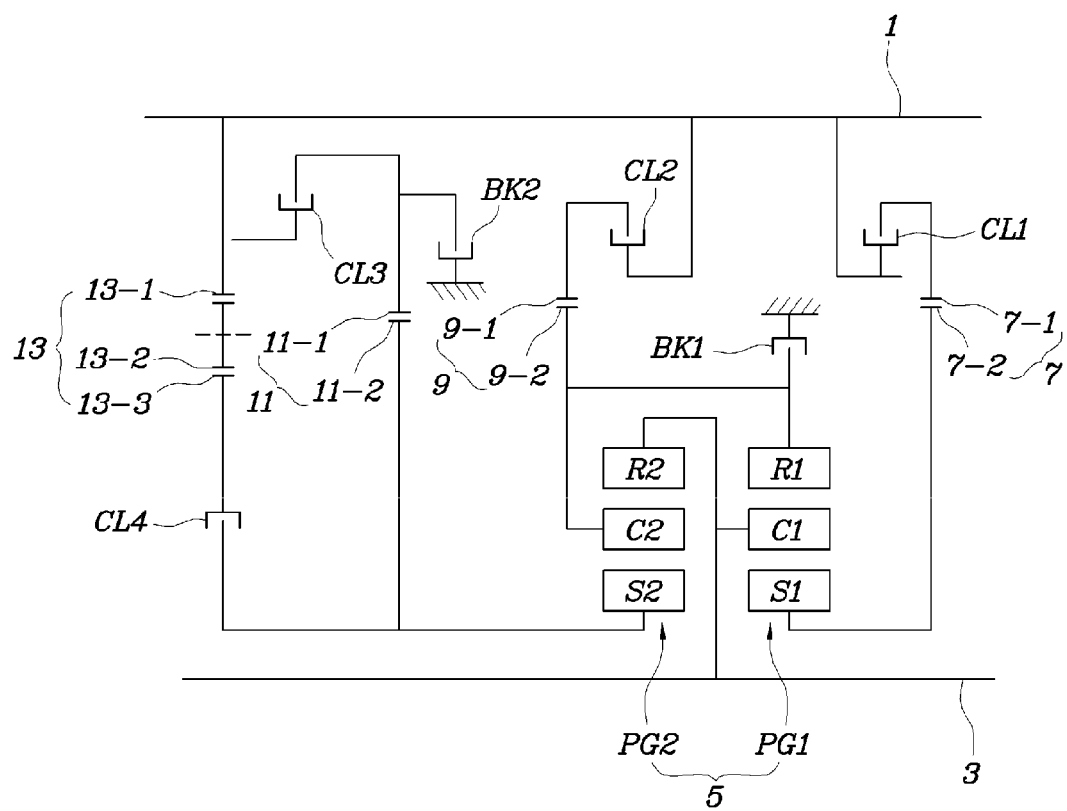
FIG. 1 is a diagram illustrating a gear train in a multistage transmission for vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a gear train in a multistage transmission for vehicles according to an exemplary embodiment of the present invention includes: input and output shafts 1 and 3 disposed parallel with each other, a complex planetary gear device 5 concentrically mounted with regard to the output shaft 3 and having four rotary components including one rotary component coupled to the output shaft 3, first to third pairs of external gears 7, 9, and 11 designed to allow the input shaft 1 to mesh with respective three rotary components of the complex planetary gear device 5, first to third clutches CL1, CL2, and CL3 designed to selectively interrupt the coupling of the three rotary components of the complex planetary gear device 5 to the input shaft 1 via the first to third pairs of external gears 7, 9, and 11, a train 13 of external gears designed to allow either of the rotary components of the complex planetary gear device 5, other than the rotary component coupled to the output shaft 3, and the input shaft 1 to engage in a series of two external meshes, a fourth clutch CL4 designed to selectively interrupt a power transmission path of the train 13 of external gears, and first and second brakes BK1 and BK2 designed to respectively selectively interrupt the rotation of the second and third pairs of external gears 9 and 11.

That is, the complex planetary gear device 5 is configured such that two simple planetary gear sets each having three rotary components are axially coupled to each other respective using one rotary component, thereby configuring the complex planetary gear device 5 having four rotary components in total. Further, the configuration is made such that the first to third pairs 7, 9, and 11 of external gears are disposed such that power from the input shaft 1 is speed-changed and transmitted to the three rotary components among the four rotary components in respective gear ratios and that one remaining rotary component is coupled to the output shaft 3 so that speed-changed power is output through the output shaft.

In addition, the configuration is made such that the power from the input shaft 1 is selectively transmitted to either one of the rotary components of the complex planetary gear device 5 via the train 13 of external gears and such that the first and second brakes BK1 and BK2 are provided in order to selectively interrupt the action of a portion of the rotary components for the speed-changing operation of the complex planetary gear device 5.

The complex planetary gear device 5 is configured so that two single pinion type simple planetary gear sets are coupled to each other in such a manner that respective two rotary components that are different from each other are continuously connected.

That is, according to the present embodiment, the complex planetary gear device 5 is configured as a CR-CR type complex planetary gear device in which a carrier and a ring gear of first and second planetary gear sets PG1 and PG2, each having three rotary components, are continuously connected to each other.

Thus, a first carrier C1 of the first planetary gear set PG1 and a second ring gear R2 of the second planetary gear set PG2 are coupled to the output shaft 1 in the state of being continuously coupled, and a first sun gear S1 of the first planetary gear set PG1 is connected to the input shaft 1 via the first pair 7 of external gears. In addition, a ring gear R1 of the first planetary gear set PG1 and a second carrier C2 of the second planetary gear set PG2 are coupled to the input shaft 1 via the second pair 9 of external gears in the state of being continuously coupled, and a second sun gear S2 of the second planetary gear set PG2 is connected to the input shaft 1 via the third pair 11 of external gears.

The first pair 7 of external gears includes a first driving gear 7-1 rotating concentrically with regard to the input shaft 1, and a first driven gear 7-2 rotating concentrically with regard to the output shaft 3. The second pair 9 of external gears includes a second driving gear 9-1 rotating concentrically with regard to the input shaft 1, and a second driven gear 9-2 rotating concentrically with regard to the output shaft 3. The third pair 11 of external gears includes a third driving gear 11-1 rotating concentrically with regard to the input shaft 1, and a third driven gear 11-2 rotating concentrically with regard to the output shaft 3.

The first clutch CL1 is mounted such that it interrupts the connection between the input shaft 1 and the first driving gear 7-1, the second clutch CL2 is mounted such that it interrupts the connection between the input shaft 1 and the second driving gear 9-1, and the third clutch CL3 is mounted such that it interrupts the connection between the input shaft 1 and the third driving gear 11-1.

The first brake BK1 is coupled to the second driven gear 9-2, which is integrally connected to the first ring gear R1 of the first planetary gear set PG1 and the second carrier C2 of the second planetary gear set PG2, and the second brake BK2 is coupled to the third driving gear 11-1.

Thus, when the first brake BK1 is operated, rotation of the second driven gear 9-2 and the second driving gear 9-1, as well as the first ring gear R1 and the second carrier C2, is interrupted. Further, when the second brake BK2 is operated, rotation of the third driven gear 11-2 and the second sun gear S2, as well as the third driving gear 11-1, is interrupted.

The train 13 of external gears and the fourth clutch CL4 are disposed parallel with the third pair 11 of external gears and the third clutch CL3 between the input shaft 1 and the rotary components of the complex planetary gear device 5.

That is, the train 13 of external gears is serially connected to the fourth clutch CL4 such that one end thereof is connected to the input shaft 1 and the other end thereof is connected to the second sun gear S2, one of rotary components of the complex planetary gear device 5, thereby having a structure in which it connects the input shaft 1 and the complex planetary gear device 5 while being arranged parallel with the third pair 11 of external gears and the third clutch CL3.

More specifically, the train 13 of external gears includes a first external gear 13-1 which is connected to the input shaft 1 so as to rotate concentrically with regard to the input shaft 1, a third external gear 13-3 which is connected to the rotary component of the complex planetary gear device 5 via the fourth clutch CL4 so as to rotate concentrically with regard to the output shaft 3, and a second external gear 13-2 which is mounted so as to be circumscribed by the first and third external gears 13-1 and 13-3.

That is, the first external gear 13-1, the second external gear 13-2, the third external gear 13-3, and the fourth clutch CL4 are serially connected in sequence from the input shaft 1, and the fourth clutch is finally connected to the second sun gear S2.

As shown in FIG. 2, the gear train in a multistage transmission for vehicles, which is constructed as described before, can be implemented in nine forward speed and one reverse speed transmission stages by selectively operating a total of six frictional elements, including the first to fourth clutches CL1 to CL4 and the first and second brakes BK1 and BK2.

In addition, as can be known in FIG. 2, the gear train in a multistage transmission for vehicles is implemented so that all transmission stages can be respectively accomplished by action between two of the frictional elements. In addition, the gear train is configured such that it is possible to carry out so-called sequential speed-changing in which, in the operation between the two frictional elements, one frictional element remains stationary and the other frictional element is changed to another frictional element adjacent thereto, thereby speed-changing to another transmission stage.

Further, as shown in FIG. 3, the gear train may be configured such that a transmission ratio is made so that, based on the determination of the sixth speed being a 1:1 transmission ratio, on the transmission stages below the sixth speed, speed-reduction is performed, and on the transmission stages above the sixth speed, speed-increase is performed. In addition, since the inter-stage ratio between adjacent transmission stages remains in a uniform, appropriate level, a transmission impact caused by an excessive inter-stage ratio is prevented, and a practical speed-changing effect is obtained with an appropriate level of inter-stage ratio.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train apparatus in a multistage transmission for vehicles, comprising:
    input and output shafts disposed parallel with each other;
    a complex planetary gear device concentrically mounted with regard to the output shaft and having four rotary components including one rotary component coupled to the output shaft;
    first to third pairs of external gears designed to allow the input shaft to mesh with respective three rotary components of the complex planetary gear device;
    first to third clutches designed to selectively interrupt the coupling of the three rotary components of the complex planetary gear device to the input shaft via the first to third pairs of external gears respectively;
    a train of external gears designed to allow either of the rotary components of the complex planetary gear device, other than the rotary component coupled to the output shaft, and the input shaft to engage in a series of two external meshes;
    a fourth clutch designed to selectively interrupt a power transmission path of the train of external gears; and
    first and second brakes designed to respectively selectively interrupt the rotation of the second and third pairs of external gears.

2. The gear train apparatus in the multistage transmission for vehicles according to claim 1, wherein the complex planetary gear device is configured so that two single pinion type simple planetary gear sets are coupled to each other in such a manner that respective two rotary components that are different from each other are continuously connected to form the four rotary components of the complex planetary gear device.

3. The gear train apparatus in the multistage transmission for vehicles according to claim 1, wherein the complex planetary gear device is configured as a CR-CR type complex planetary gear device in which a first carrier and a second ring gear of first and second planetary gear sets, each having three rotary components, are continuously connected to each other.

4. The gear train apparatus in the multistage transmission for vehicles according to claim 3, wherein a first ring gear and a second carrier of the first and second planetary gear sets are continuously connected to each other.

5. The gear train apparatus in the multistage transmission for vehicles according to claim 3, wherein:
    the first carrier of the first planetary gear set and the second ring gear of the second planetary gear set are coupled to the output shaft in the state of being continuously coupled therebetween; and a first sun gear of the first planetary gear set is connected to the input shaft via the first pair of external gears; and
    wherein a first ring gear of the first planetary gear set and a second carrier of the second planetary gear set are coupled to the input shaft via the second pair of external gears in the state of being continuously coupled therebetween, and a second sun gear of the second planetary gear set is connected to the input shaft via the third pair of external gears.

6. The gear train apparatus in the multistage transmission for vehicles according to claim 5, wherein:
    the first pair of external gears includes a first driving gear rotating concentrically with regard to the input shaft, and a first driven gear rotating concentrically with regard to the output shaft;
    the second pair of external gears includes a second driving gear rotating concentrically with regard to the input shaft and a second driven gear rotating concentrically with regard to the output shaft;
    the third pair of external gears includes a third driving gear rotating concentrically with regard to the input shaft, and a third driven gear rotating concentrically with regard to the output shaft;
    the first brake is coupled to the second driven gear, which is integrally connected to the first ring gear of the first planetary gear set and the second carrier of the second planetary gear set; and
    the second brake is coupled to the third driving gear.

7. The gear train apparatus in the multistage transmission for vehicles according to claim 1, wherein:
    the first pair of external gears includes a first driving gear rotating concentrically with regard to the input shaft, and a first driven gear rotating concentrically with regard to the output shaft;
    the second pair of external gears includes a second driving gear rotating concentrically with regard to the input shaft, and a second driven gear rotating concentrically with regard to the output shaft; and
    the third pair of external gears includes a third driving gear rotating concentrically with regard to the input shaft, and a third driven gear rotating concentrically with regard to the output shaft.

8. The gear train apparatus in the multistage transmission for vehicles according to claim 7, wherein:
    the first clutch is mounted so as to selectively connect the input shaft and the first driving gear;
    the second clutch is mounted so as to selectively connect the input shaft and the second driving gear; and
    the third clutch is mounted so as to selectively connect the input shaft and the third driving gear.

9. The gear train apparatus in the multistage transmission for vehicles according to claim 8, wherein:
    the first brake is mounted so as to selectively fix the second driven gear; and
    the second brake is mounted so as to selectively fix the third driving gear.

10. The gear train apparatus in the multistage transmission for vehicles according to claim 1, wherein the train of external gears and the fourth clutch are disposed parallel with the third pair of external gears and the third clutch between the input shaft and the rotary components of the complex planetary gear device.

11. The gear train apparatus in the multistage transmission for vehicles according to claim 10, wherein the train of external gears includes:
    a first external gear which is connected to the input shaft so as to rotate concentrically with regard to the input shaft;
    a third external gear which is connected to the rotary component of the complex planetary gear device via the fourth clutch so as to rotate concentrically with regard to the output shaft; and a second external gear which is mounted so as to be circumscribed by the first and third external gears.

12. The gear train apparatus in the multistage transmission for vehicles according to claim 11, wherein:
the first clutch is mounted so as to selectively connect one of the rotary components of the complex planetary gear device and the first driven gear;
the second clutch is mounted so as to selectively connect one of the three rotary components of the complex planetary gear device and the second driven gear; and
the third clutch is mounted so as to selectively connect one of the rotary components of the complex planetary gear device and the third driven gear.

13. The gear train apparatus in the multistage transmission for vehicles according to claim 11, wherein:
the first brake is mounted so as to selectively fix the second driven gear; and
the second brake is mounted so as to selectively fix the third driving gear.

14. The gear train apparatus in the multistage transmission for vehicles according to claim 11, wherein the fourth clutch is mounted so as to selectively connect the input shaft and the train of external gears.

* * * * *